(12) United States Patent
Kim et al.

(10) Patent No.: US 6,532,050 B1
(45) Date of Patent: Mar. 11, 2003

(54) LIQUID CRYSTAL DISPLAY DEVICE WITH TFTS ON COLOR FILTERS, AND METHOD OF MANUFACTURING THE SAME

(75) Inventors: Woong-Kwon Kim, Kyonggi-do (KR); Jeong-Hyun Kim, Kyonggi-do (KR)

(73) Assignee: LG. Philips CD Co., Ltd., Seoul (KR)

( * ) Notice: Subject to any disclaimer, the term of this patent is extended or adjusted under 35 U.S.C. 154(b) by 76 days.

(21) Appl. No.: 09/612,378

(22) Filed: Jul. 7, 2000

(30) Foreign Application Priority Data

Jul. 8, 1999 (KR) .......................................... 99-27378

(51) Int. Cl.[7] ............................................ G02F 1/1335
(52) U.S. Cl. ........................................ 349/106; 349/43
(58) Field of Search ........................ 349/104–111, 106

(56) References Cited

U.S. PATENT DOCUMENTS 5,058,997 A * 10/1991 Dickerson et al. ............ 349/59
5,777,707 A * 7/1998 Masaki et al. ............... 349/110
6,310,672 B1 * 10/2001 Koike et al. ................ 349/106

* cited by examiner

Primary Examiner—Toan Ton
Assistant Examiner—Timothy Rude
(74) Attorney, Agent, or Firm—Birch, Stewart, Kolasch & Birch, LLP

(57) ABSTRACT

The liquid crystal display includes first and second disposed substrates spaced apart from each other and having a gap therebetween. A liquid crystal is in the gap, and a color filter is formed on the second substrate. A switching element is formed over the color filter such that the liquid crystal is disposed between the first substrate and the switching element.

21 Claims, 3 Drawing Sheets

US 6,532,050 B1

LIQUID CRYSTAL DISPLAY DEVICE WITH TFTS ON COLOR FILTERS, AND METHOD OF MANUFACTURING THE SAME

CROSS REFERENCE

This application claims the benefit of Korean Patent Application No. 1999-27378, filed on Jul. 8, 1999, under 35 U.S.C. §119, the entirety of which is hereby incorporated by reference.

BACKGROUND OF THE INVENTION

1. Field of the Invention

The present invention relates to a liquid crystal display (LCD) device, and more particularly, to a thin film transistor liquid crystal display (TFT-LCD) device and a method of manufacturing the same.

2. Description of Related Art

A liquid crystal display (LCD) device has been widely spread over the world as a display for a personal computer, a portable electronic gadget, a portable television receiver and the like because of its features of low voltage drive, light weight, low cost and the like. Of these, a TFT (thin film transistor)-LCD (liquid crystal display) using a twisted nematic liquid crystal (TN-LC) has been widely used as a high performance display, which is a substitution for a cathode ray tube since the liquid crystal display has features of high precision, high image quality and high-speed response.

FIG. 1 is a cross-sectional view illustrating a conventional liquid crystal (LC) panel. As shown in FIG. 1, the LC panel has lower and upper substrates 2 and 4 with a LC layer 10 interposed between the lower and upper substrates 2 and 4. The lower substrate 2 has the TFT "S" as a switching element to change an orientation of the LC molecules and includes a pixel electrode 14 to apply a voltage to the LC layer 10 according to signals of the TFT "S". The upper substrate 4 has a color filter 8 for implementing colors and a common electrode 12 on the color filter 8. The common electrode 12 serves as an electrode for applying a voltage to the LC layer 10. The pixel electrode 14 is arranged over a pixel portion "P", i.e., a display area. Further, to prevent leakage of the LC injected into a space between the two substrates 2 and 4, the two substrates 2 and 4 are sealed by a sealant 6.

However, the LCD device described above, as shown in FIG. 1, has a problem in that light leakage (a bright line) may occur in the vicinity of an end portion of the LC panel due to the difference between the thermal expansion coefficients of the two array substrates 2 and 4. Such a difference of the thermal expansion coefficient occurs since the two array substrates 2 and 4 differ in processing temperature. That is, the processing temperatures of the lower and upper substrates 2 and 4 are about 300° C. and 220° C., respectively. To overcome such a problem, a width of a black matrix 9 is increased as shown in FIG. 2, thereby providing an align margin ΔL to align the lower and upper substrates 2 and 4 with each other, whereupon an aperture ratio of the LC panel is reduced by the align margin at least. The above-described problem gets worse as the LC panel increases in size. Besides, the manufacturing process using the above conventional technique is very complicated and thus, a yield of the color filter is very low, leading to high production costs.

To avoid such disadvantages, a technique for forming the color filter on the TFT array substrate such as shown in FIGS. 3A and 3B has been introduced. FIG. 3A shows the typical TFT array substrate 1 having a TFT region "S", and a pixel region "P". As shown in FIG. 3B, a color resin composition is deposited on a pixel electrode 14 and patterned to form a color filter layer 30. In general, the process shown in FIG. 3B is repeated three times to form three color filter layers 30 of R (red), G (green) and B (blue), which are the three primary colors.

However, in the LCD device fabricated using the technique described above, since the color filter layers 30 are formed directly on the pixel electrode 14 of the TFT array substrate, a cell gap is not uniform, and spots on a display screen may occur. In other words, as shown in FIG. 3B, the color filter layers 30 have two regions 30a and 30b, which differ in thickness. That is, the thickness of the region 30b of the color filter layer 30 is "A", whereas the thickness of the region 30a of the color filter layer 30 is "A-B". As a result, a cell gap of the LC panel is not uniform, leading to display degradation.

Further, the yield of the color filter is generally lower than that of the TFT array substrate. In the case of the technique for forming the color filter on the TFT array substrate, if defects occur during manufacturing of the color filter, the TFT array substrate cannot be used, leading to a very low yield of the LCD device.

SUMMARY OF THE INVENTION

An object of the present invention is to provide a liquid crystal display device having a good display characteristic, a high aperture ratio and a high yield.

In order to achieve the above object, the present invention provides a liquid crystal display device, including; first and second substrates spaced apart from each other and having a gap therebetween; liquid crystal in the gap; a color filter formed on the second substrate; and a switching element formed on the color filter such that liquid crystal is disposed between the first substrate and the switching element. The liquid crystal display device further comprises a passivation film formed over the second substrate and covering the switching element. The liquid crystal display device further comprises a flat layer, having a flat upper surface, formed over the color filter.

The liquid crystal display device further includes a buffer layer formed on the flat layer, and a pixel electrode formed on the passivation film. The passivation film has a contact hole formed on a predetermined portion of the switching element so that the pixel electrode contacts the switching element. The color filter includes a plurality of black matrixes formed on the second substrate and spaced apart from each other; and a plurality of color filter layers formed between the black matrixes.

The switching element is a thin film transistor (TFT) having a gate electrode, a semiconductor layer, and source and drain electrodes. The flat layer is made of a material selected from a group consisting of benzocyclobutene (BCB), acryl, polyimide, methylsilazane, and polysilazane. The flat layer is made of a material having $Na^+$, $K^+$, $Ba^+$, or $Ca^+$. The buffer layer is made of an inorganic material selected from a group consisting of $SiO_x$, $SiN_x$, $TaN_x$, and $Ta_2O_5$. The color filter layer comprises one of a color resin and a dye having a heat resistance greater than 120° C. The black matrix is made of one of a black resin and a material selected from a group consisting of Cr, Mo, and Cr/CrOx. The pixel electrode is formed on a location corresponding to one of the color filter layers.

The present invention also provides a method of manufacturing a liquid crystal display device, including: providing first and second substrates; forming a color filter on the second substrate; forming a switching element on the color filter; sealing the first and second substrate to form a gap therebetween; and injecting liquid crystal into the gap such that the liquid crystal is disposed between the switching element and the first substrate.

The switching element is a thin film transistor (TFT). The color filter includes a plurality of black matrixes spaced apart from each other and a plurality of color filter layers formed between the black matrixes.

The method further includes forming a passivation film on the switching element, forming a flat layer over the color filter and forming a buffer layer on the flat layer; the switching element being formed on the buffer layer.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to preferred embodiments of the present invention, examples of which are illustrated in the accompanying drawings.

Figure 1:
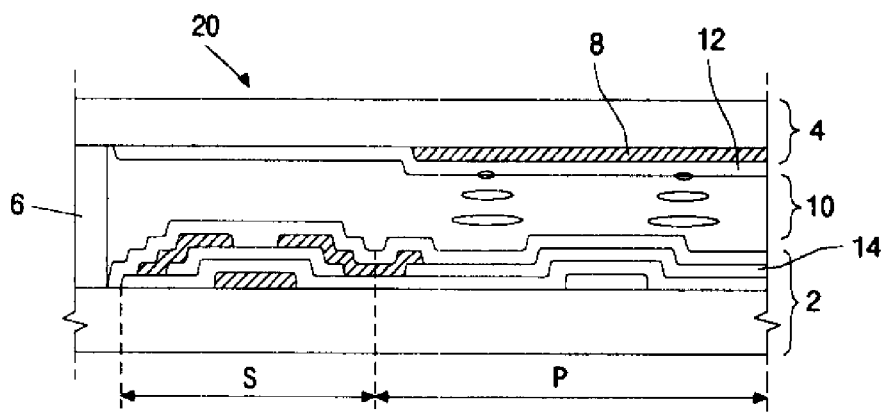
FIGS. 1 and 2 are cross-sectional views illustrating a liquid crystal display device according to the related art.
Figure 2:
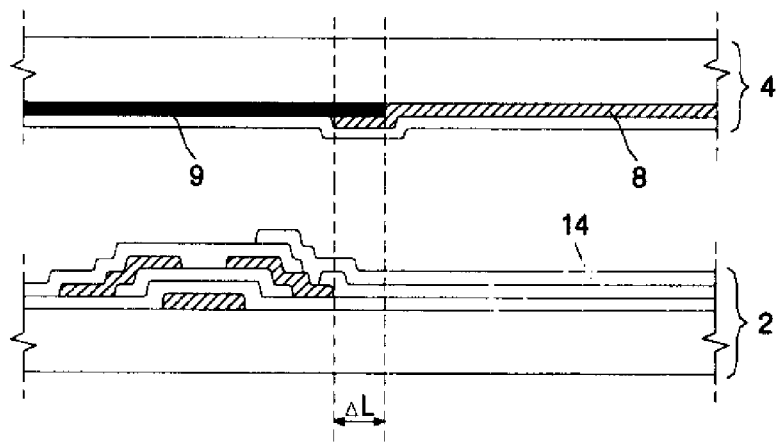
Figure 3A:
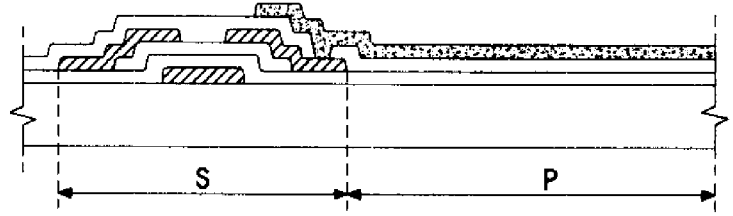
FIGS. 3A and 3B are cross-sectional views illustrating a liquid crystal display device according to another related art.
Figure 3B:
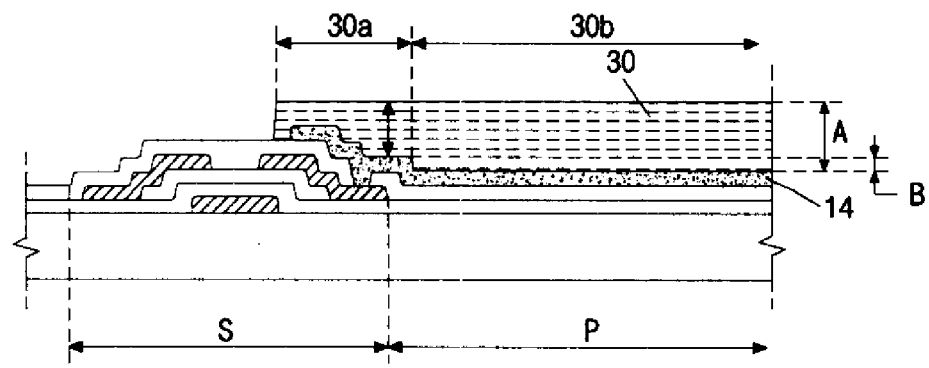
Figure 4A:
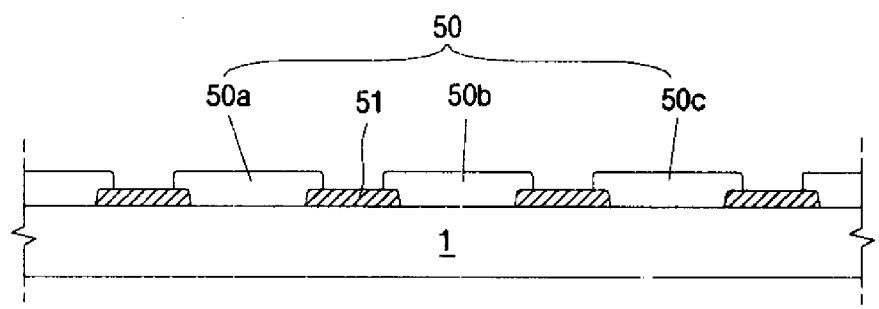
FIGS. 4A to 4C are cross-sectional views illustrating a process of manufacturing a liquid crystal display device according to a preferred embodiment of the present invention.
Figure 4B:
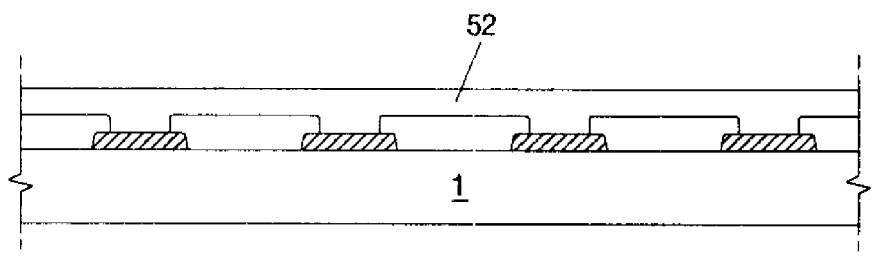
Figure 4C:
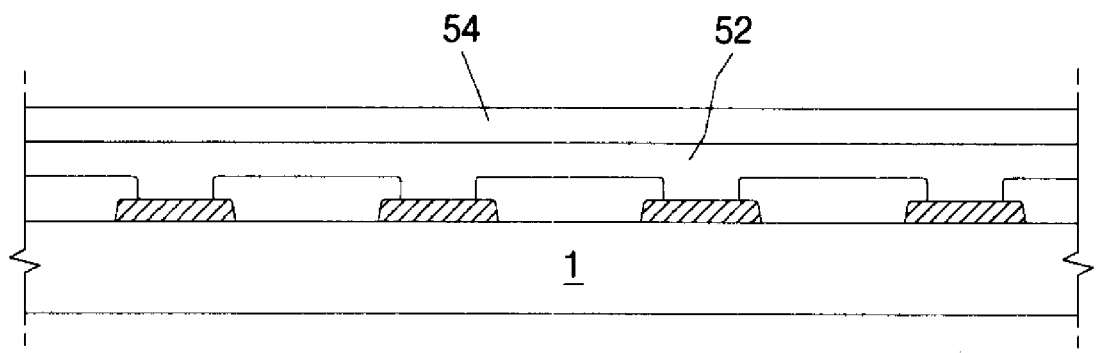

FIGS. 4A to 4C show a process of manufacturing a liquid crystal display device according to a preferred embodiment of the present invention. As shown in FIG. 4A, after forming a black matrix 51, color filter layers 50a, 50b and 50c are sequentially formed on a substrate 1 to form a color filter. The black matrix 51 is made of a material selected from a group consisting of Cr, Mo, Cr/CrOx, a black resin and the like. The color filter layers 50a, 50b and 50c comprise color resins of R (red), G (green) and B (blue) preferably having a heat resistance temperature higher than about 120° C., and can have a single or a multi-layered structure of a dye, a pigment and an inorganic material. Further, the black matrix can be formed after forming the color filter and optionally do not need to be formed because gate, source and drain electrodes, and gate and data lines that will be formed in subsequent processes can serve as the black matrix.

Sequentially, as shown in FIG. 4B, a flat layer 52 is formed on the color filter to provide a flat upper surface for the color filter array substrate 1. The flat layer 52 is made of an organic material having excellent flatness and preferably of material selected from a group consisting of benzocyclobutene (BCB), acryl, polyimide, methylsilazane, polysilazane and the like.

Then, as shown in FIG. 4C, a buffer layer 54 is formed on the flat layer 52. The buffer layer 54 serves to prevent an impurity generated from the color filter layer 50 from affecting a switching element that will be formed in later process. The buffer layer 54 is made of either an organic material or an inorganic material. The inorganic material includes SiOx, SiNx, TaNx, $Ta_2O_5$ and the like. The process of forming the buffer layer 54 can be omitted when the flat layer 52 is made of a material having no ion, for example, $Na^+$, $K^+$, $Ba^+$, $Ca^+$ and the like.

Figure 5:
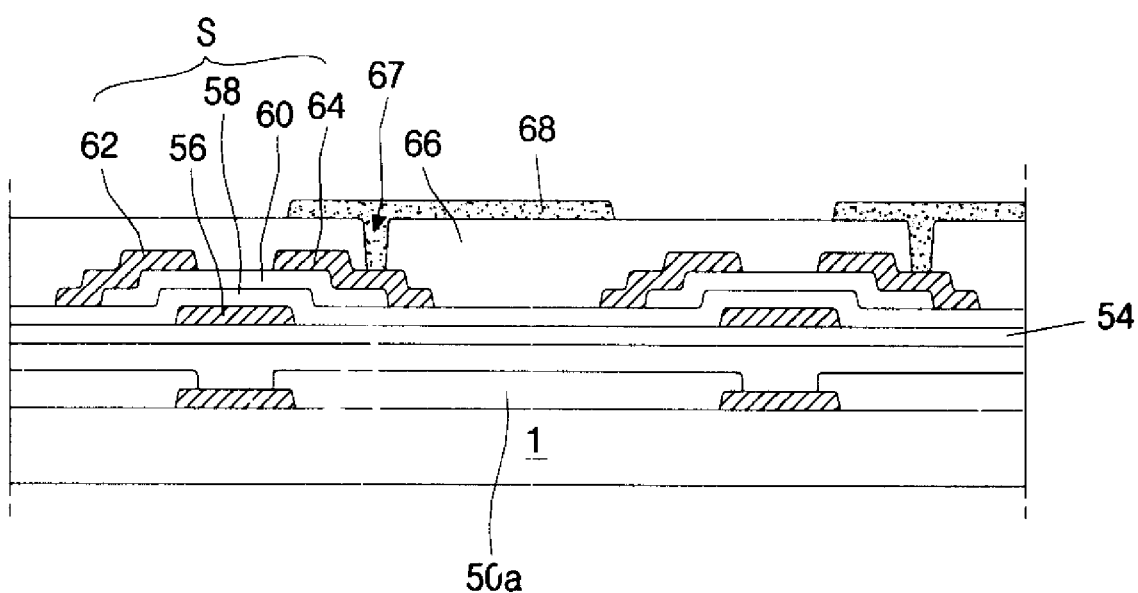
FIG. 5 is a cross-sectional view illustrating the liquid crystal display device according to the preferred embodiment of the present invention.

After inspecting the color filters fabricated by the processes described above, of these, only satisfactory color filters are subjected to subsequent processing. FIG. 5 shows a process for forming a thin film transistor on the color filter array substrate 1. As shown in FIG. 5, a switching element "S" including a gate electrode 56, a gate insulating layer 58, an active layer 60, source and drain electrodes 62 and 64 is formed sequentially on the buffer layer 54. A passivation film 66 is formed on the whole surface of the substrate 1 covering the source and drain electrodes 62 and 64. A portion of the passivation film 66 over the drain electrode 64 is etched to form a contact hole 67, and a pixel electrode 68 is formed on the passivation film 68 to contact the drain electrode 64 through the contact hole 67. The pixel electrode 67 is formed on a location corresponding vertically to one of the color filter layers 50a, 50b and 50c. At this time, the switching element "S" can use either an amorphous silicon layer or a polysilicon layer as the active layer 60, and a TFT or a diode having a switching operation can be used as the switching element "S".

In this embodiment, a processing temperature of the color filter layer 50 and the switching element "S" is preferably less than 220° C., and several electrodes are made of a metal: the gate electrode 56; the source electrode 62; and the drain electrode 64. Further, the pixel electrode 68 is made of a transparent conductive material, and the passivation film 66 is made of either an organic or an inorganic material and can have a single or a multi-layered structure.

As described hereinbefore, according to the preferred embodiment of the present invention, the total yield of the LCD device is improved since the inferiority of the LCD due to the inferiority of the color filter does not occur. Further, the aperture ratio increases since the black matrix does not need to be increased for providing a sufficient align margin that reduces the aperture ratio by forming the TFT components on the color filter. While the invention has been particularly shown and described with reference to preferred embodiments thereof, it will be understood by those skilled in the art that the foregoing and other changes in form and details may be made therein without departing from the spirit and scope of the invention.

What is claimed is:

1. A liquid crystal display device, comprising: first and second substrates spaced apart from each other having a gap therebetween;

liquid crystal in the gap;

a color filter formed over the second substrate;

a switching element formed over the color filter such that the liquid crystal is disposed between the first substrate and the switching element;

a passivation film formed over the second substrate including the switching element;

a flat layer, having a flat upper surface, formed over the second substrate including the color filter, and wherein the switching element is formed over the flat layer; and a buffer layer formed on the flat layer, and wherein the switching element is formed on the buffer layer.

2. The liquid crystal display device of claim 1, wherein the switching element is a thin film transistor (TFT).

3. The liquid crystal display device of claim 1, wherein the flat layer is made of a material selected from a group consisting of benzocyclobutene (BCB), acryl, polyimide, methylsilazane, and polysilazane.

4. The liquid crystal display device of claim 1, wherein the flat layer is made of a material having $Na^+$, $K^+$, $Ba^+$, or $Ca^+$.

5. The liquid crystal display device of claim 1, wherein the buffer layer is made of an inorganic material selected from a group consisting of SiOx, SiNx, TaNx, and $Ta_2O_5$.

6. The liquid crystal display device of claim 1, further comprising:
   a pixel electrode formed on the passivation film, the passivation film having a contact hole formed on a predetermined portion of the switching element so that the pixel electrode contacts the switching element.

7. The liquid crystal display device of claim 1, wherein the switching element includes a gate electrode, a semiconductor layer, and source and drain electrodes.

8. The liquid crystal display device of claim 1, wherein the color filter comprises one of a color resin and a dye having a heat resistance more than 120° C.

9. The liquid crystal display device of claim 1, wherein the color filter includes:
   a plurality of black matrixes formed on the second substrate and spaced apart from each other; and
   a plurality of color filter layers formed between the black matrixes.

10. The liquid crystal display device of claim 9, wherein the black matrix is made of one of a black resin and a material selected from a group consisting of Cr, Mo, and Cr/CrOx.

11. The liquid crystal display device of claim 9, further comprising
   a pixel electrode formed on the passivation film, the passivation film having a contact hole formed on a predetermined portion of the switching element so that the pixel electrode contacts the switching element of the TFT, the pixel electrode being formed on a location corresponding to one of the color filter layers.

12. A method of manufacturing a liquid crystal display device, comprising:
   providing first and second substrates;
   forming a color filter on the second substrate;
   forming a switching element over the color filter;
   forming a flat layer, having a flat upper surface, over the color filter, and
   wherein the forming a switching element step forms the switching element over the flat upper surface;
   forming a buffer layer on the flat layer, and wherein the forming a switching element step forms the switching element on the buffer layer;
   sealing the first and second substrates to form a gap therebetween; and
   injecting liquid crystal into the gap so that liquid crystal is disposed between the first substrate and the switching element.

13. The method of claim 12, wherein the switching element is a thin film transistor(TFT).

14. The method of claim 13, wherein the color filter includes a plurality of black matrixes spaced apart from each other and a plurality of color filter layers formed between the black matrixes.

15. The method of claim 12, wherein the switching element includes a gate electrode, a semiconductor layer, and source and drain electrodes.

16. The method of claim 12, further comprising:
   forming a passivation film over the switching element.

17. The method of claim 16, further comprising:
   forming a pixel electrode on the passivation layer such that the passivation film has a contact hole over a predetermined portion of the switching element so that the pixel electrode contacts the switching element.

18. The method of claim 17, wherein the pixel electrode is formed at a location corresponding to the color filter.

19. The liquid crystal display device of claim 12, wherein the flat layer is made of a material having $Na^+$, $K^+$, $Ba^+$, or $Ca^+$.

20. The liquid crystal display device of claim 15, wherein the buffer layer is made of an inorganic material selected from a group consisting of SiOx, SiNx, TaNx, and $Ta_2O_5$.

21. The liquid crystal display device of claim 12, wherein the color filter comprises one of a color resin and a dye having a heat resistance more than 120° C.

* * * * *

UNITED STATES PATENT AND TRADEMARK OFFICE
CERTIFICATE OF CORRECTION

PATENT NO. : 6,532,050 B1
DATED : March 11, 2003
INVENTOR(S) : Woong-Kwon Kim et al.

It is certified that error appears in the above-identified patent and that said Letters Patent is hereby corrected as shown below:

<u>Title page,</u>
Item [73], Assignee, please change from "LG. PHILIPS CD CO., LTD" to the following: -- LG. PHILIPS LCD CO., LTD. --

Signed and Sealed this

Eleventh Day of May, 2004

JON W. DUDAS
*Acting Director of the United States Patent and Trademark Office*